United States Patent [19]

Engalitcheff, Jr. et al.

[11] 3,964,886
[45] June 22, 1976

[54] GAS SCRUBBING APPARATUS

[75] Inventors: John Engalitcheff, Jr., Gibson Island; Edward N. Schinner, Silver Spring, both of Md.

[73] Assignee: Baltimore Aircoil Company, Inc., Jessup, Md.

[22] Filed: Oct. 29, 1974

[21] Appl. No.: 518,848

[52] U.S. Cl. ............................. 55/228; 55/257 PV; 55/466; 261/6; 261/116
[51] Int. Cl.² ............................................. B01D 47/00
[58] Field of Search ............................. 55/227–229, 55/245, 248, 250, 257 PV; 261/116, 5, 6; 210/44, 525, 537; 209/169, 170

[56] References Cited
UNITED STATES PATENTS

| | | | |
|---|---|---|---|
| 885,185 | 4/1908 | Serrell | 55/355 U X |
| 1,688,998 | 10/1928 | Swinney | 209/170 |
| 1,952,727 | 3/1934 | Ralston | 209/170 X |
| 1,966,280 | 7/1934 | Bingman | 261/116 X |
| 2,267,426 | 12/1941 | Saunders et al. | 55/257 X |
| 2,484,277 | 10/1949 | Fisher | 55/228 X |
| 2,554,428 | 5/1951 | Swearingen | 55/257 X |
| 3,050,188 | 8/1962 | Nisser et al. | 209/170 |
| 3,266,227 | 8/1966 | Plizak et al. | 55/426 |
| 3,691,733 | 9/1972 | Stockford | 55/257 |
| 3,775,311 | 11/1973 | Mook et al. | 210/44 |
| 3,794,306 | 2/1974 | Engalitcheff, Jr. | 55/227 U X |
| 3,795,089 | 3/1974 | Reither | 55/257 X |
| 3,802,158 | 4/1974 | Ohle | 55/228 |
| 3,807,145 | 4/1974 | Engalitcheff, Jr. et al. | 55/228 X |

FOREIGN PATENTS OR APPLICATIONS

| | | | |
|---|---|---|---|
| 699,859 | 2/1931 | France | 55/227 |

*Primary Examiner*—Frank W. Lutter
*Assistant Examiner*—Kathleen J. Prunner
*Attorney, Agent, or Firm*—Michael C. Sudol, Jr.; J. Jerome Behan

[57] ABSTRACT

An air pumping and scrubbing apparatus which is suitable for use in spray paint booths is described. This apparatus uses liquid sprays directed into a conduit to cause an air pumping action to inject air into the conduit and dis-discharge to atmosphere using water pressure to move the air so as to avoid the necessity for any moving parts or electrical corrections in and around the air stream. The liquid sprays impinge on mist eliminator strips and are recovered along with foreign material from the air while the air is exhausted downstream of the strips. A novel transfer plate arrangement is provided between the strips and a sump to minimize foreign material buildup on structual surfaces while allowing stratification in the sump; and novel baffle means are provided to cause a controlled air blowback across the sump to facilitate collection of the floating material therein.

15 Claims, 5 Drawing Figures

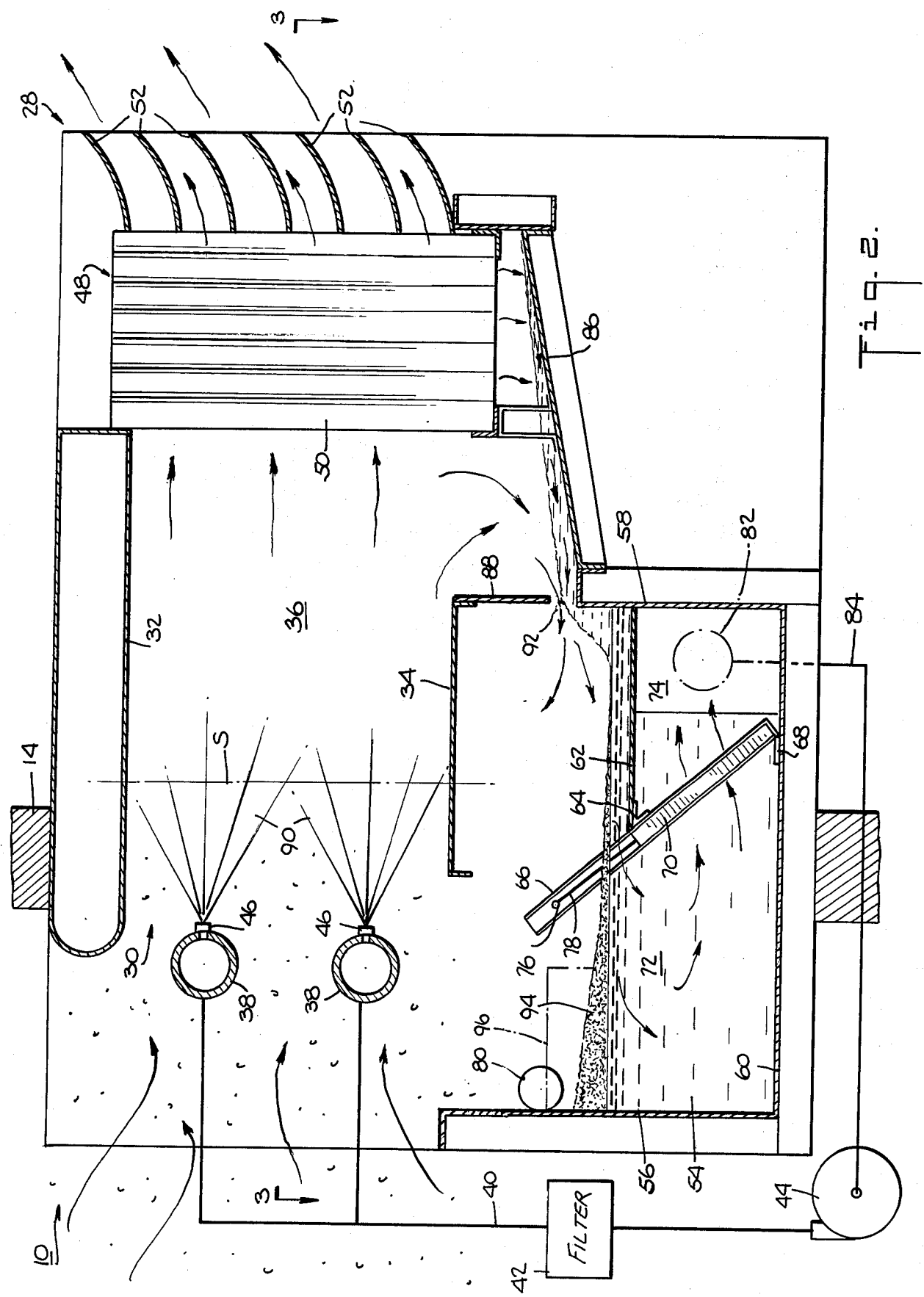

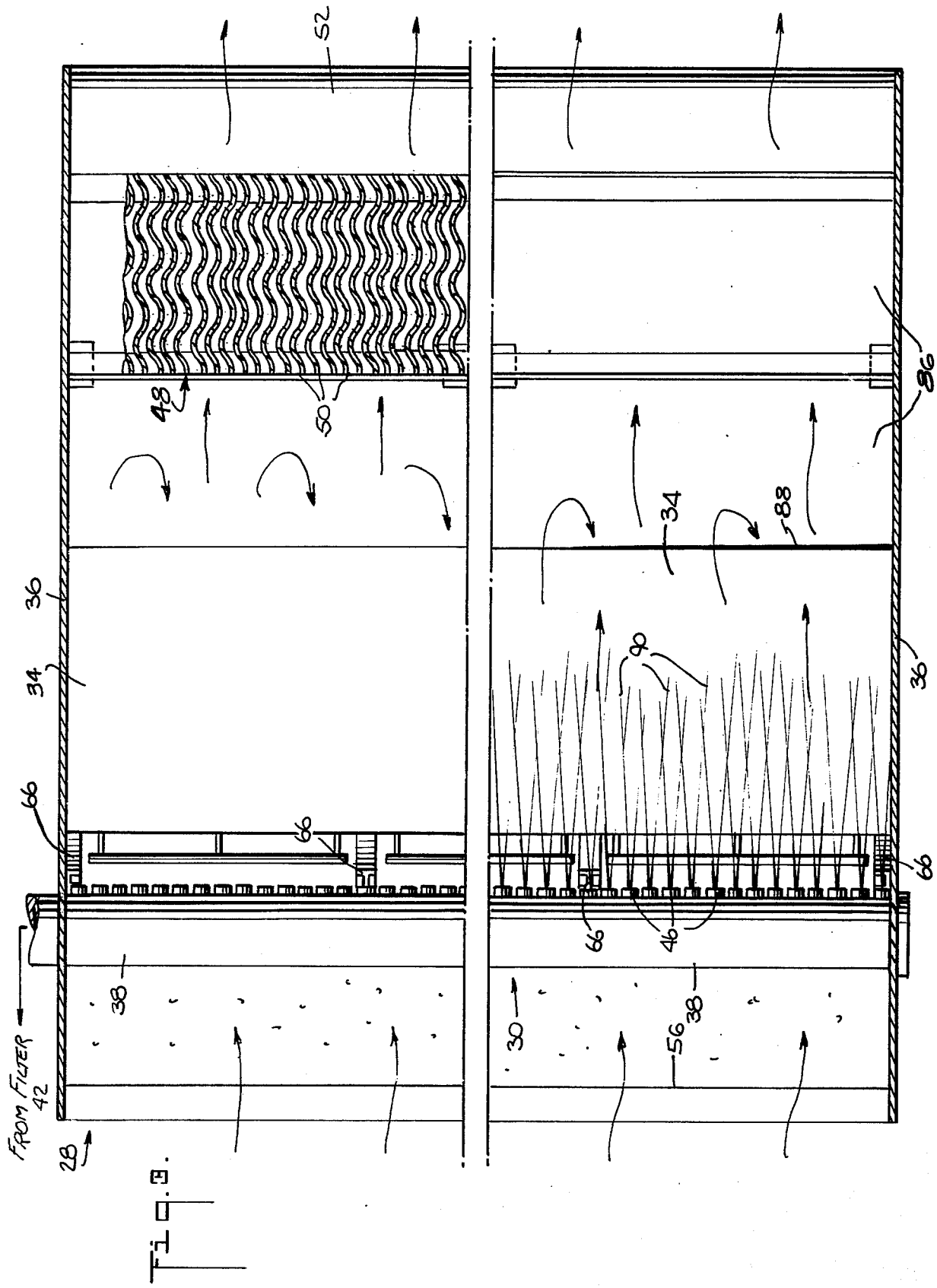

GAS SCRUBBING APPARATUS

BACKGROUND OF THE INVENTION

1. Field of the Invention

This invention relates to the treatment of gases and more particularly it concerns an improved air scrubbing device.

2. Description of the Prior Art

U.S. Pat. No. 2,032,404 and No. 2,337,983, both to E. F. Fisher, relate to air cleaning devices wherein air to be cleaned is drawn into and through a conduit by the action of water or other liquid sprayed into the conduit. Foreign particles suspended in the air, e.g. paint from spray guns, are drawn into the conduit along with the surrounding air; and these particles are caught on the sprayed liquid. In both these Fisher patents the conduit is vertical and the liquid spray is directed downwardly into a sump. The foreign particles are carried into the sump by the downward spray. Thereafter the foreign particles are supposed to stratify in the sump, i.e. they should either sink or float according to their specific gravity; and then they are removed from the spray liquid by means of baffles or by skimming.

The devices shown in the above described Fisher patents would result in high turbulence due to the forcible impingement of the liquid sprays upon the liquid in the sump. This turbulence causes considerable frothing and foaming and hinders stratification in the sump. Also the Fisher devices are not capable of maintaining the floating material urged over to one side of the sump for convenient removal.

U.S. Pat. No. 1,222,541 to B. C. Donham relates to an air washer for cleaning foreign particles from compressed air. This air washer comprises a conduit through which the air passes and nozzles positioned at one end to spray a liquid along the length of the conduit. This tends to drive the air forwardly through the conduit while at the same time foreign particles in the air are caught up on the liquid spray within the conduit. The liquid is then separated from the accompanying air by means of eliminator plates located toward the downstream end of the device. The liquid flows down the plates and into a sump located below the conduit.

The device shown in the Donham patent would be unsatisfactory for cleaning air of adhesive type particles, such as paint, since materials of this nature would start to build up on the eliminator plates from the lower ends thereof. Also that device does not have an open sump of sufficiently large surface to allow stratification of the foreign material in the recovered liquid.

U.S. Pat. No. 3,807,145 to Engalitcheff et al shows a fluid treatment apparatus whose overall structure is similar to that of its present invention. In the Engalitcheff et al device, water sprays are directed into a conduit to impinge on mist eliminator strips. It has been discovered that the device of the Engalitcheff et al patent is capable of effectively extracting foreign particles from the air because of the intimate contact of air and water; and the present invention provides improvements which permit effective recovery and separation of these foreign materials from the sprayed liquid in an Engalitcheff et al type device.

SUMMARY OF THE INVENTION

The present invention makes possible the recovery of foreign particulate material from a gas such as air without appreciable buildup of the foreign material on structural surfaces. Also, the present invention provides novel sump arrangements wherein foreign material which floats in the sump is blown continuously over to one side of the sump for easy recovery.

According to one aspect of the present invention there is provided a conduit which is adapted to extend out from an enclosure such as a paint spray booth. Nozzle means are provided to spray liquid into the conduit to inject gas or air from the enclosure into and through the conduit so that foreign particles in the air are caught on the sprayed liquid. Mist eliminator means, comprising a plurality of closely spaced parallel strips, are distributed across the conduit cross section of the conduit downstream of the nozzles. The strips extend in a generally upright direction and they have corrugations extending along their length to intercept the sprayed liquid. A sump is positioned under the conduit to receive the liquid caught on the strips; and a transfer surface is arranged to extend from a position under the strips to the sump. The transfer surface is inclined downwardly toward the sump with its uppermost edge located a finite distance below the bottom of the strips and its lowermost edge located at a finite distance below its upper edge, and preferably above the liquid level in the sump. This arrangement ensures that the liquid will move rapidly over all structural surfaces so that adhesive type foreign particles will be prevented from building up on these surfaces. At the same time this arrangement avoids the spraying or dropping of liquid downwardly into the sump at a high vertical velocity; so that high turbulence and foaming are avoided and the stratification of foreign material in the sump is facilitated.

According to a further aspect of the invention there is provided means for maintaining a continuous flow of gas or air over a recovery sump in an air cleaning system so that the foreign material floating in the sump is continuously urged over to the air entry side thereof for easy recovery, as by skimming. This continuous flow is achieved by providing an injector type conduit, such as described above, in which the liquid sprays form a pressure seal within the conduit. The force of the liquid sprays produces a positive pressure region in the conduit between the pressure seal and the mist eliminator means. Gas or air is selectively tapped from this positive pressure region and is directed laterally across the liquid surface in the sump to blow the floating matter in the sump over to one end thereof.

The liquid spray arrangements of the present invention provide, through evaporative heat transfer, a certain amount of cooling to the gas passing through the system so that the gas or air is both cooled and cleaned at the same time.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the concept upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification wherein:

FIG. 2 is an enlarged elevational section view of the air pumping and cleaning device shown in FIG. 1;

FIG. 3 is a fragmentary section view, partially cut away, taken along line 3—3 of FIG. 2;

DETAILED DESCRIPTION OF PREFERRED EMBODIMENT

Figure 1:
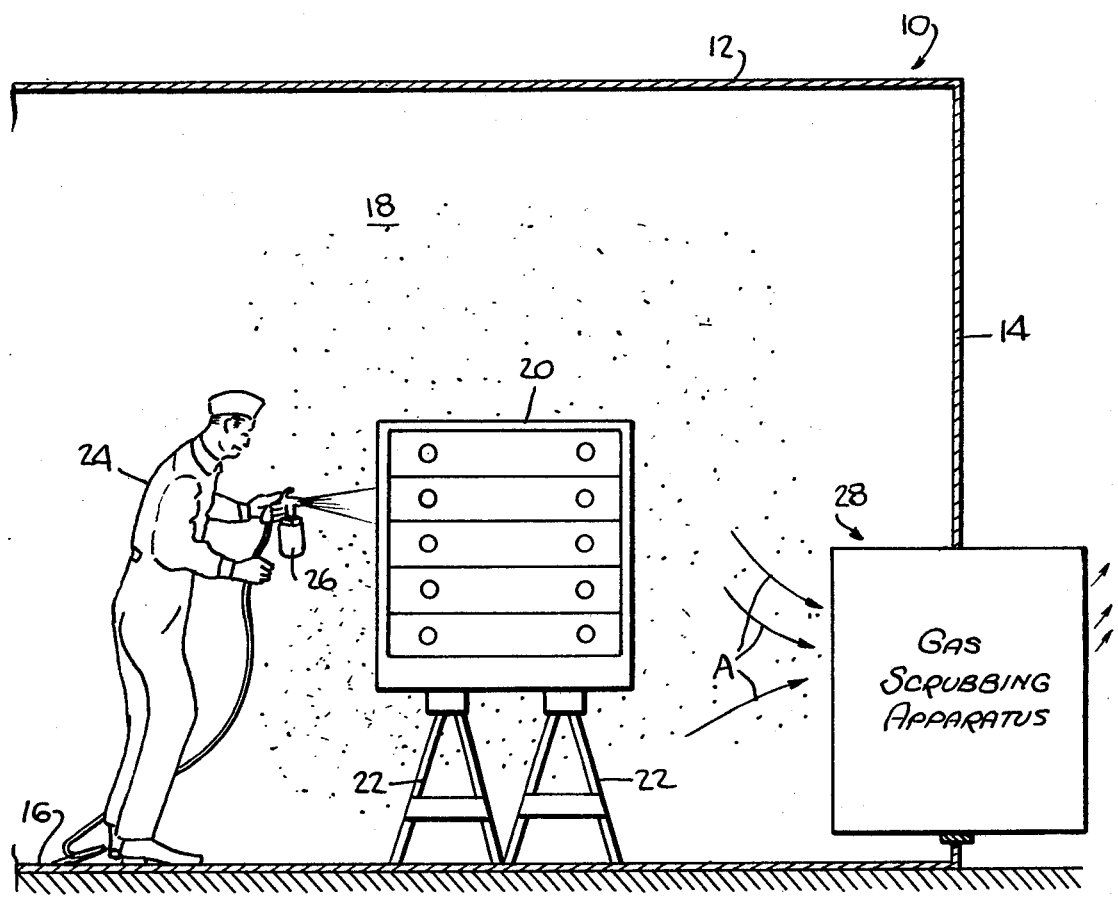
FIG. 1 is a side elevational view of a paint spray booth in which an air pumping and cleaning device of the present invention is incorporated.
Figure 5:
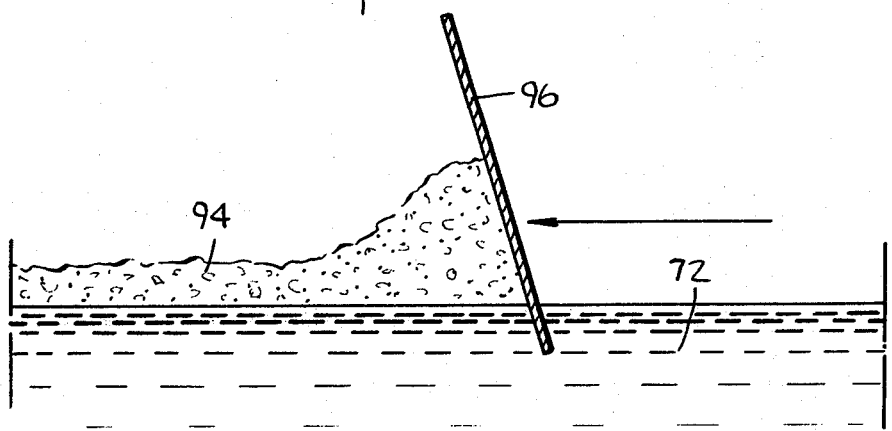
FIG. 5 is an enlarged section view taken along line 5—5 of FIG. 4.

As shown in FIG. 1 a paint spray booth 10 is made up of a top wall 12 a rear wall 14 and a floor 16. Side walls 18, which may merely be canvas curtains, are also provided at each side of the device. The paint spray booth may be a separate external structure, or as is more usually the case, it may be built into one area of a factory building or other structure. The end of the booth 10 opposite its rear wall 14 is open to external atmosphere, such as the atmosphere within the factory building or other structure.

A workpiece 20 to be painted is mounted on pedestals 22 resting on the floor 16. An operator 24 operates a paint spray gun 26 to paint the workpiece 20; and in the course of this painting the air within the enclosure becomes laden with paint particles.

An air cleaning and pumping apparatus 28, hereinafter referred to as a scrubber embodying the present invention, is mounted to extend through the rear wall 14. As indicated by arrows A in the drawing, this apparatus draws the paint laden air from within the booth 10 and exhausts it to the outer atmosphere. During the course of this air movement the air is cleaned of foreign particulate material so that substantially particulate free air is exhausted from the scrubber. Replacement air is automatically drawn into the booth 10 from the surrounding atmosphere.

As shown in the section views of FIG. 2 and 3 the air scrubber 28 comprises a conduit 30 which extends through the rear wall 14. The conduit 30 opens at one end, i.e. its forward or entrance end, into the booth 10 and it opens at the other end, i.e. its exit end, to the outer atmosphere. The conduit 30 is defined by an upper horizontal wall 32, a lower spray plate 34 and a pair of side walls 36. Upper and lower spray manifolds 38 extend across the width of the conduit 30 in the vicinity of its entrance end. One end of each manifold is closed while the other end is connected via a supply line 40 to a filter 42 and a supply pump 44. Spray nozzles 46 are distributed along the length of each of the manifolds 38; and these nozzles are aimed to direct liquid sprays toward the exit end of the conduit 30.

Mist eliminator means 48 are provided at the exit end of the conduit 30. This mist eliminator means comprises a plurality of closely spaced strips 50 distributed across the conduit cross section. As shown in FIGS. 2 and 3, the strips 50 are of elongated sheet material and they extend in a generally upright direction, i.e. one end of each strip is higher than the other, with the plane of each strip lying parallel to the flow of air through the conduit. The strips 50 are provided with corrugations or bends extending along their length to provide a tortous path for fluids attempting to pass out through the exit end of the conduit. A plurality of parallel, horizontally extending, upwardly curved turning vanes 52 are distributed across the exit end of the conduit 30 just downstream of the mist eliminator means 48. These turning vanes serve to direct the flow of exiting air upwardly and away from the apparatus.

A sump 54 is arranged below the conduit 30. This sump extends widthwise along the entire width of the apparatus, and it extends lengthwise from a location upstream of the spray manifolds 38 to a location coincident with the downstream edge of the lower spray plate 34. (It should be understood that the term "lengthwise", as used herein, means the direction along the conduit 30 between its inlet and outlet ends, whereas the term "widthwise" refers to the direction between the side walls 36 of the conduit). As can be seen in FIGS. 2 and 3 the lower spray plate 34 terminates upstream of the mist eliminator means 48. The sump 54 is formed by forward and rearward walls 56 and 58 and a bottom plate 60 (FIG. 2) and it is closed at the sides by the conduit side walls 36.

Figure 4:
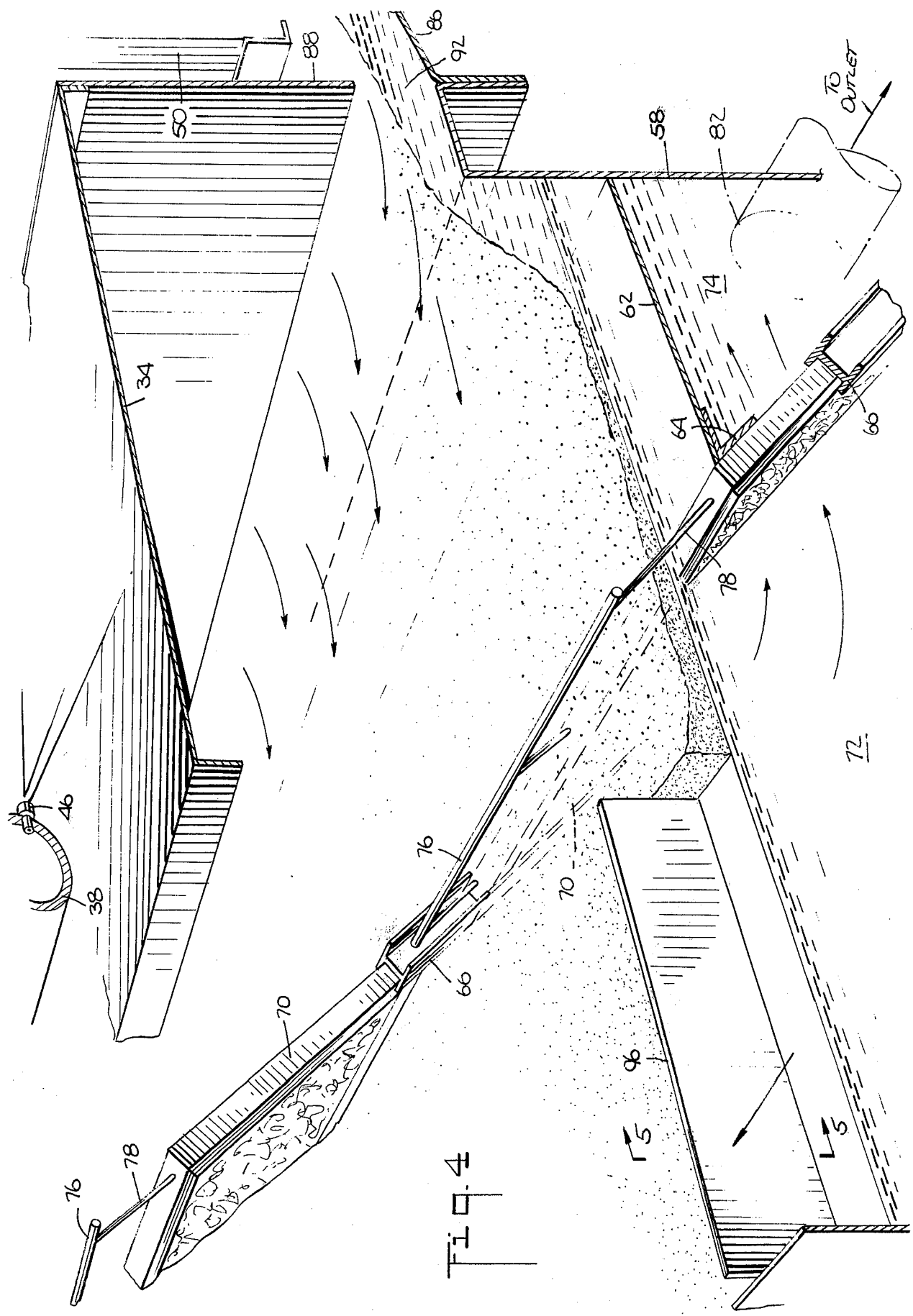
FIG. 4 is a fragmentary perspective view showing a sump region forming part of the air pumping and cleaning device of FIG. 1.

As can be seen in FIGS. 2 and 4 a partition plate 62 extends horizontally across the sump between the sidewalls 36 and forward from the rearward sump wall 58 back to a location approximately half way to the forward wall 56. The partition plate is located at a height approximately three fourths of the height of the rearward wall 58. The forward edge of the partition plate 62 is connected via an angled bracket 64 to slanted filter support channels 66. These support channels, as can be seen in FIG. 4, are parallel to each other and are spaced apart along the width of the sump. They slant downwardly from the forward edge of the partition plate 62 to the bottom plate 60 of the sump 54 where they are secured by means of a bottom bracket 68. The channels 66 also extend upwardly beyond the support plate 62 to locations above the sump water level.

As can be seen in FIG. 4 rectangularly shaped perforated strainer plates 70 are fitted to slide down between adjacent support channels 66 in the sump 54. It will be noted that these strainer plates, when fully in place, extend down from the support plate 62 to the bottom wall 60 and divide the sump into a main sump region 72 and an outlet region 74 so that all water which flows through the sump is made to flow through the strainer plates 70 before passing into the outlet region 74. The strainer plates 70 are provided with handles 76 connected to their upper edges by rods 78 to facilitate their removal for cleaning or repair.

The sump 54 is provided with an overflow opening 80 at one of the sidewalls 36; and a conventional float type valve arrangement (not shown) is also provided in the sump to supply makeup water so as to maintain a predetermined liquid level in the sump as shown approximately one inch (2.54 cm) below the top of the rearward sump wall 58.

The sump 54 is also provided with an outlet opening 82 along one of the sidewalls 36 in the outlet region 74. This outlet opening is connected via a water line 84 to the supply pump 44.

A slanted transfer plate 86 extends under the mist eliminator strips 50 and down to the top edge of the rearward sump wall 58. The transfer plate 86 does not touch the mist eliminator strips but instead it is located generally about an inch (2.54 cm) below the lower edges of the strips.

A vertical air flow control baffle 88 extends down from the rearward edge of the lower spray plate 34 to a location also about an inch (2.54 cm) above the junction of the transfer plate 86 with the rearward sump wall 58. As can be seen in FIG. 2, the sump 54 communicates with the conduit 30 just under the baffle 88.

In operation of the above described apparatus, the pump 44 operates continuously to draw water from the sump 54 and to force this water through the filter 42 and into the manifolds 38. Water is then sprayed from the nozzles 46 into the conduit 30 toward the mist eliminator means 50. This spraying causes air from the spray booth 10 to be injected into the conduit 30 where it is cleaned and exhausted as described below.

Preferably, the nozzles 46 are configured to produce generally flat fan shaped sprays 90 (FIGS. 2 and 3) of oval or elliptical cross section with their longer axes vertical. This maximizes the surface area of the sprays and provides good air-water contact so that the amount of air pumped through the apparatus and the degree of scrubbing produced by the water sprays on the air is maximized. In addition, the fan shaped sprays intersect with each other and with the conduit walls 32, 34 and 36 in a rather well defined region in the vicinity of the phantom line S in FIG. 2. The water sprays within the conduit 30 strip foreign particulate matter, such as paint particles, from the air being carried through the conduit. Thus the paint particles or other particulate matter which is initially carried along by the incoming air stream becomes captured and carried along by the concurrently flowing liquid sprays. When the water sprays and accompanying air encounter the mist eliminator strips 50 the corrugations in the strips decrease the forward momentum of the heavier water sprays. As a result, the air passes between the strips and out past the turning vanes 52 with minimal resistance while the water sprays, with their forward momentum reduced, flow downwardly under the influence of gravity along the strips 50 toward the transfer plate 86. This water carries with it the paint particles and other foreign particulate matter stripped from the air in the conduit so that a mixture of water and foreign material drops down to the transfer plate 86. It will be noted that because the transfer plate 86 is located at a finite distance below the mist eliminator strip 50, the downwardly flowing mixture moves rapidly past the lower edges of the strips as it drops down toward the transfer plate 86. This provides a continuous washing effect to prevent building of foreign materials on the lower edges of the strips. In cases where the strips 50 would extend directly into a sump, a portion of the liquid flow from the strips would tend to stagnate in the vicinity of the bottom of the strips and would result in a buildup of foreign material on the strips beginning at their lower ends.

The water and foreign material which drops down onto the transfer plate 86 continues to flow rather rapidly along its upper surface and through a slit like opening 92, defined by the air flow control baffle 88 and the rearward sump wall 58, into the rearward region of the sump 54.

In the sump, the mixture of water and foreign material flow back over the partition plate 62 toward the main sump region 72, as shown in FIG. 2. Because of the substantial depth of the sump, the flow velocity of this mixture is relatively slow, as compared with the flow velocity of the water and foreign material down the eliminator strips 50 and along the transfer plate 86, so that the foreign material stratifies in the sump. The greater portion of the foreign material in painting operations is usually lighter than the sprayed water and consequently this greater portion floats as a scrum 94 on top of the water in the sump. If desired the ability of the scum to stratify and float can be enhanced by "compounding" i.e. by chemical treatment of the water. Most of the heavier portion is carried down with the water flowing toward the outlet 82 and is collected in the region 72 on the bottom plate 60. Some of the other particles are caught on the strainer plates 70 as the water flows through them toward the outlet 82. The particular construction, arrangement and operation of the strainer plates 70 serves to provide a self-cleansing action so that good straining is obtained for long periods of time without need for cleaning of the plates. The manner in which this occurs is described in detail in U.S. Pat. application Ser. No. 448,760 filed Mar. 6, 1974.

The arrangement of the transfer plate 86 and the sump 54 serves to prevent buildup of paint or other foreign material on the structural surfaces of the system while at the same time this arrangement permits stratification of the foreign material in the sump for easy collection and removal by skimming and straining. In the prior art, difficulties had been encountered in connection with build-up of foreign material on structural surfaces and with stratification of the foreign material in the sump. In order to obtain stratification so that the foreign material can be collected and easily separated, the water or other liquid which carries the foreign material should move slowly in non-turbulent fashion. However when the liquid moves slowly, the foreign particulate material carried in the liquid tends to build up on the structural surfaces of the device. On the other hand, when the liquid is caused to move at high velocities, the flow is turbulent and the foreign material tends to mix with the liquid so that stratification is reduced.

It will be appreciated that with the arrangement described herein the water and foreign material intercepted by the mist eliminator strips 50 flows rapidly down the strips under the influence of gravity. Also this rapid flow continues as the water and foreign material flow off from the lower ends of the strips and down onto the transfer plate 86. The rapid flow continues along the plate so that buildup of foreign material is minimized both on the strips 50 and on the transfer plate 86. Now the depth of the liquid on the transfer plate 86 is always quite shallow since the liquid flows off the plate as rapidly as it flows onto the plate. Consequently the turbulence experienced by the liquid does not have an appreciable effect on stratification.

The incline of the transfer plate 86 is such that when the liquid flows into the sump from the transfer plate, the major component of the liquid velocity is parallel to the surface of the liquid in the sump. As a result the tendency toward turbulence in the sump is minimized. Also since the liquid depth in the sump is substantially greater than on the transfer plate, the linear liquid velocity in the sump is much slower than on the plate. Consequently flow in the sump is non turbulent and stratification can take place therein. Further, because the liquid flows from the transfer plate 86 to the region above the partition 62 before reaching the deeper region of the sump, a gradual transition in flow velocity is experienced which serves to promote stratification.

The arrangement of the baffle plate 88 in the apparatus described herein serves to maintain a propelling force on the stratified foreign material floating on the water in the sump so that this material can be easily collected and skimmed off. As pointed out above, the sprays 90 from the nozzles 46 act to form a pressure seal across the conduit 30 in the vicinity of the phantom line S (FIG. 2). The region between this seal and the mist eliminator means 48 is a positive pressure region due to the pumping action of the sprays. Because of this the apparatus provides a source pressurized air. The baffle plate 88 is arranged with its bottom edge just high enough above the water flowing down the transfer plate 86 to allow a controlled backflow of air from the positive pressure region back through the slit like opening 92 into the sump. This air flow, as seen in FIGS. 2 and 4, blows the floating foreign material in the sump back toward the rear wall 58 of the sump so that it can be collected and skimmed off with the air of a skimmer 96 which as shown, is moved across the sump while extending part way into it as shown in FIG. 4. The baffle plate 88 should not be so high as to allow blowback of more air than is necessary to propel the floating foreign material otherwise an air recirculation cycle will be set up and the amount of air actually exhausted from the booth 10 will decrease.

It will be appreciated from the foregoing that the gas scrubbing arrangements of the present invention are especially advantageous for use in combustable environments, e.g. where volatile of highly inflammable materials are sprayed into the air. This is because the air encounters only liquid sprays. No moving mechanical or electrical devices are exposed to the air being treated.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. Apparatus for scrubbing gas, said apparatus comprising a conduit having an entrance end and an exit end, nozzle means positioned near said entrance end of said conduit and arranged to spray liquid into said conduit toward its exit end, such spraying causing the injection of a gas from an enclosure into said conduit in a manner such that foreign particles to be cleaned from the gas are caught on the sprayed liquid, mist eliminator means arranged across the interior of the conduit downstream of the nozzle means to intercept the liquid spray therefrom, along with foreign particles caught on said spray, and to permit passage of the injected gas out through said exit end of the conduit, said mist eliminator means comprising a plurality of closely spaced parallel elongated strips of sheet material distributed across the cross section of the conduit and extending individually with one end higher than the other, and lying in planes parallel to the direction of gas flow through the conduit, said strips each having at least one bend extending along its length to intercept the sprayed liquid and to direct the liquid down toward its lower end, a sump arranged outside of and below said conduit and communicating with said conduit through a passageway, said sump including means for maintaining a given level of liquid therein and means forming a transfer surface extending from a position under said strips within said conduit to said sump outside said conduit, said transfer surface being inclined downwardly toward said sump with its uppermost edge located a finite distance below the bottom of said strips and its lowermost edge located a finite distance below its upper edge and said lowermost edge being in direct communication, therealong, with said sump outside said conduit, said sump being constructed and arranged to permit collection of foreign material which stratifies therein.

2. Apparatus according to claim 1 wherein said lowermost edge of said transfer surface is located at a finite distance above said given level in said sump.

3. Apparatus according to claim 1 wherein said sump extends under said conduit from a location upstream of said nozzle means.

4. Apparatus according to claim 1 wherein the incline of said transfer surface is arranged to direct the movement of liquids flowing thereon such that the major component of their velocity is parallel to the liquid surface in said sump.

5. Apparatus according to claim 1 wherein said sump includes a horizontal partition plate extending forwardly within said sump from a downstream location below the lowermost edge of said transfer surface to an upstream location closer to said nozzle means thereby to provide a gradual transition in flow velocity of liquid entering said sump, with consequent promotion of stratification.

6. Apparatus according to claim 5 wherein said partition plate extends above the bottom of said sump but below said given level.

7. Apparatus according to claim 6 wherein said sump is formed with an outlet below said partition plate whereby liquid flowing from said transfer surface must pass around said partition plate and out through said outlet.

8. Apparatus according to claim 7 wherein said sump includes strainer means extending from said partition plate to the bottom of the sump whereby said strainer means and partition plate divide the sump into a main sump region and an outlet region with said outlet extending from said outlet region.

9. Apparatus according to claim 1 wherein said nozzle means is constructed to cause a liquid spray which extends over the entire conduit cross section to form a pressure seal and to maintain a positive pressure region within said conduit and wherein said passageway opens into said positive pressure region in said conduit thereby to direct blowback gas across said sump to propel floating material to one end of said sump.

10. Apparatus for scrubbing gas, said apparatus comprising a conduit having an entrance end and an exit end, nozzle means positioned near said entrance end of said conduit and arranged to spray liquid into said conduit toward said exit end, such spraying causing the injection of gas from an enclosure into said conduit in a manner such that foreign particles to be cleaned from the gas are caught on the sprayed liquid, said nozzle means being configured to direct sprayed liquid to fill the conduit cross section and to intersect the conduit walls in a manner such as to form a pressure seal therein, mist eliminator means in said conduit downstream of said pressure seal in the path of liquid spray to intercept the sprayed liquid, said mist eliminator means being operative to separate the injected gas from the sprayed liquid and foreign particles caught thereon and to allow the thus ingested gas to exit from said exit end of said conduit and to establish a positive pressure region within said conduit between said pressure seal and said mist eliminator means, a sump positioned under said conduit, means forming a fluid passageway establishing fluid communication between said sump and said mist eliminator means to permit said sump to receive the liquid separated by said mist eliminator means and to allow stratification of substances accompanying the separated liquid, said fluid passageway means opening into said sump from said positive pressure region and being oriented to direct a finite blowback of gas from said positive pressure region across said sump to propel floating materials in the sump over to one end thereof.

11. Apparatus according to claim 10 wherein said sump extends back under said conduit from a location upstream of said nozzle means.

12. Apparatus according to claim 11 wherein the lower wall of said conduit is a lower spray plate wall which extends along said positive pressure region but terminates upstream of said mist eliminator means and wherein a baffle plate extends down from the downstream edge of said bottom spray plate wall to a location close to the level of liquid flowing into said sump from said mist eliminator means, the lower edge of said baffle plate forming the upper edge of said passageway means whereby a controlled amount of gas from said positive pressure region flows along over the liquid flowing into said sump.

13. Apparatus according to claim 12 wherein a transfer plate extends under the lower edge of said baffle plate from a location below said mist eliminator means to said sump, said transfer plate forming the lower edge of said passageway means.

14. Apparatus according to claim 10 wherein said sump includes means to remove floating material therefrom.

15. Apparatus according to claim 14 wherein said means to remove floating material comprises a skimmer.

* * * * *